Figure 6:
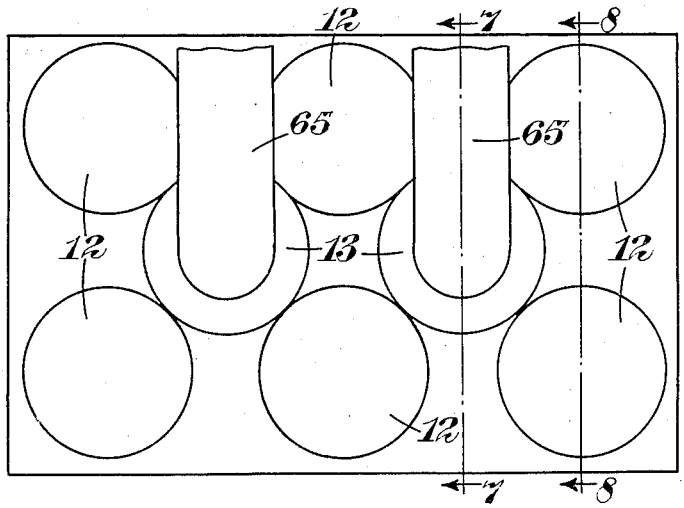

Aug. 22, 1933.  W. B. WHITNEY ET AL  1,923,695
ELECTRIC CIRCUIT BREAKER
Filed Dec. 3, 1929  6 Sheets-Sheet 1
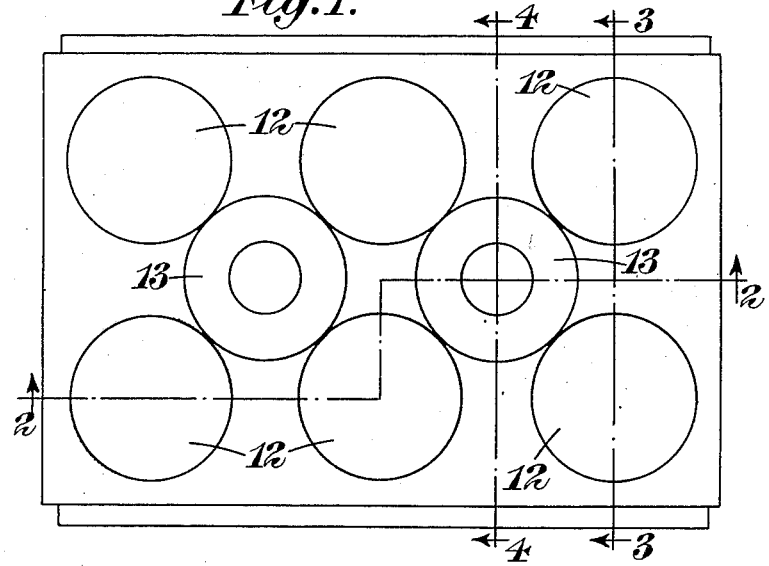
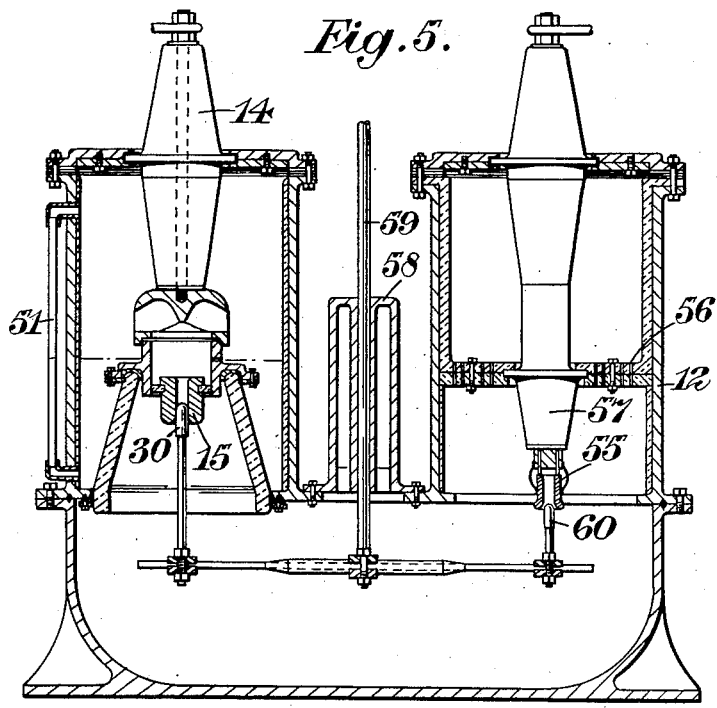

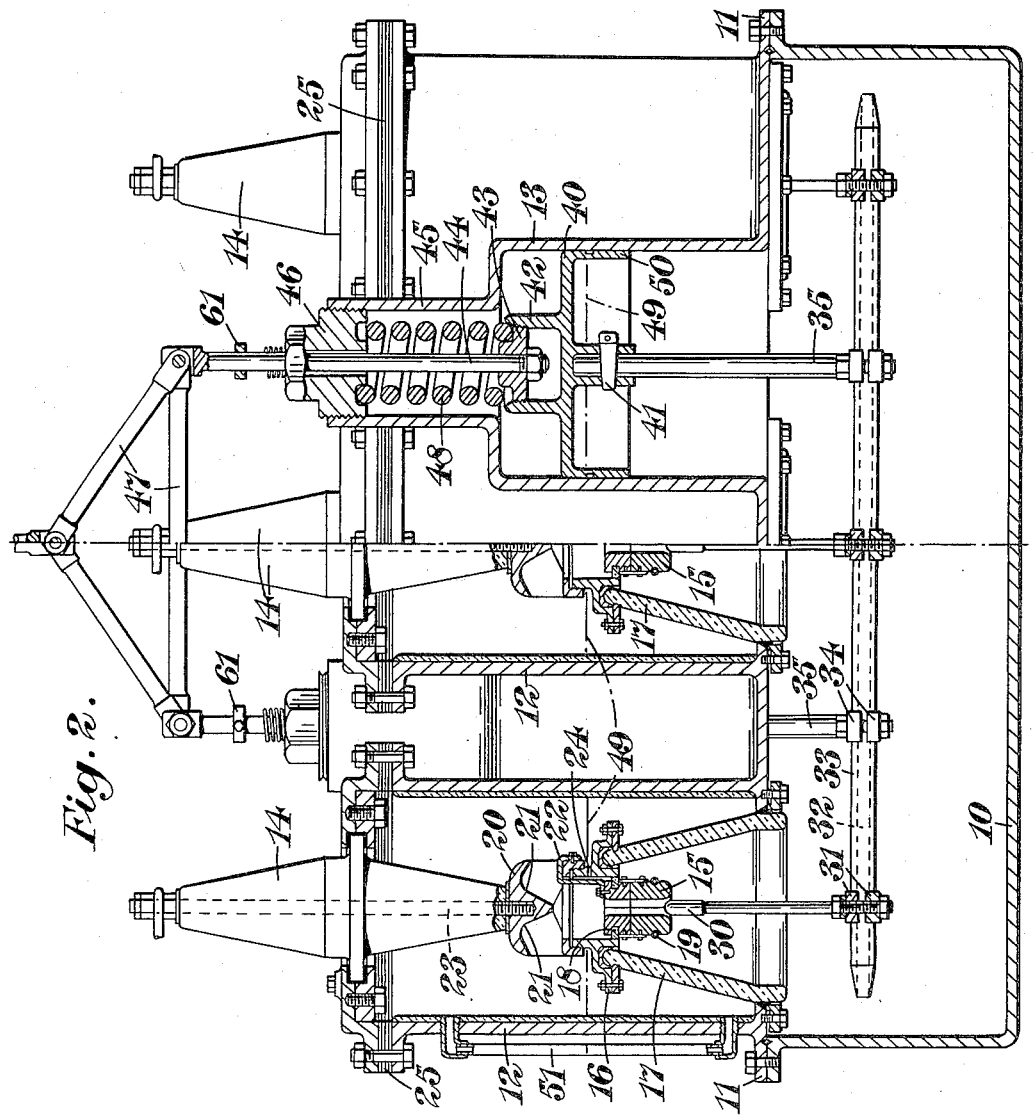

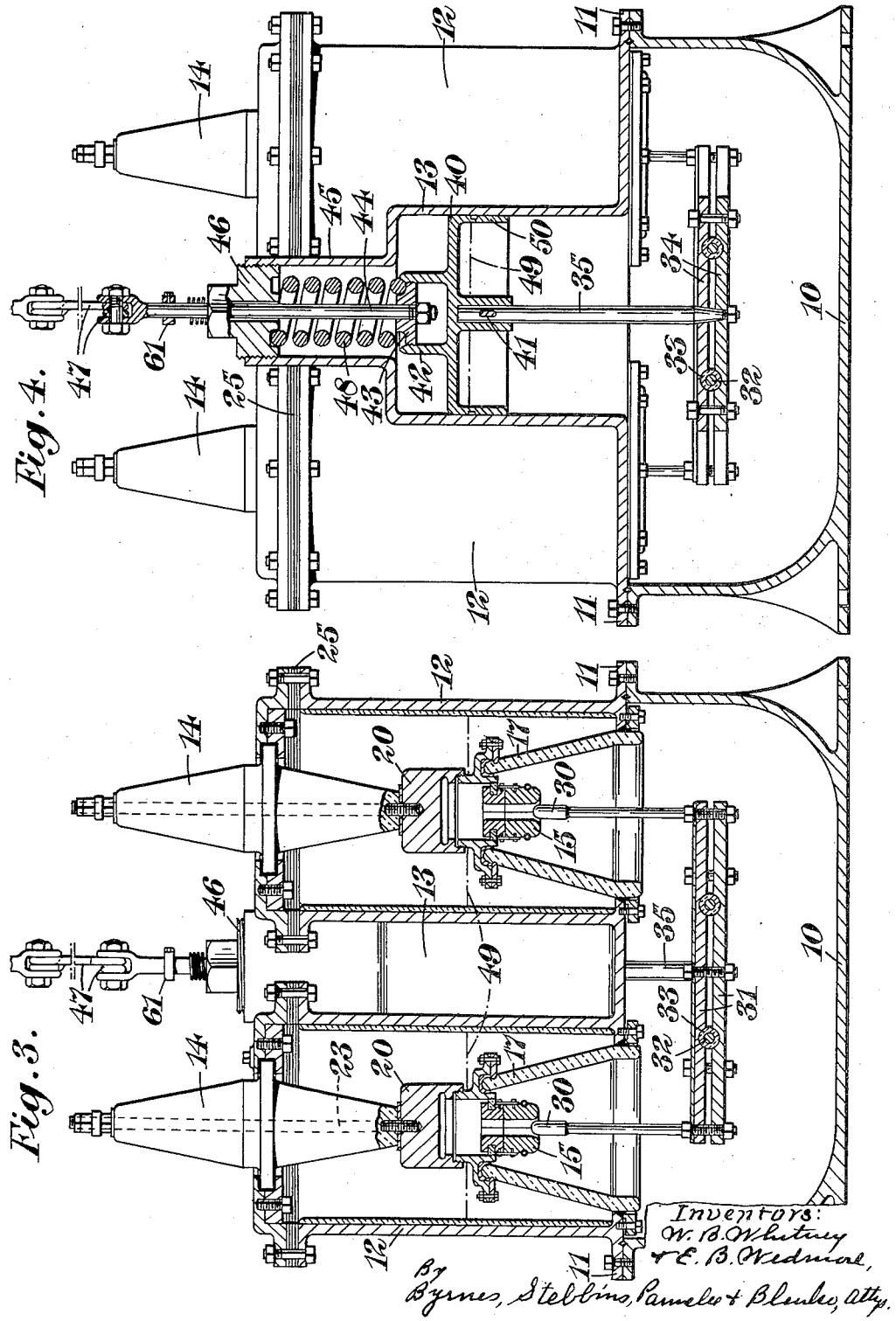

Aug. 22, 1933.  W. B. WHITNEY ET AL  1,923,695
ELECTRIC CIRCUIT BREAKER
Filed Dec. 3, 1929   6 Sheets-Sheet 4

Inventors:
W. B. Whitney
E. B. Wedmore
by Byrnes, Stebbins,
Parmelee & Blenko, attys.

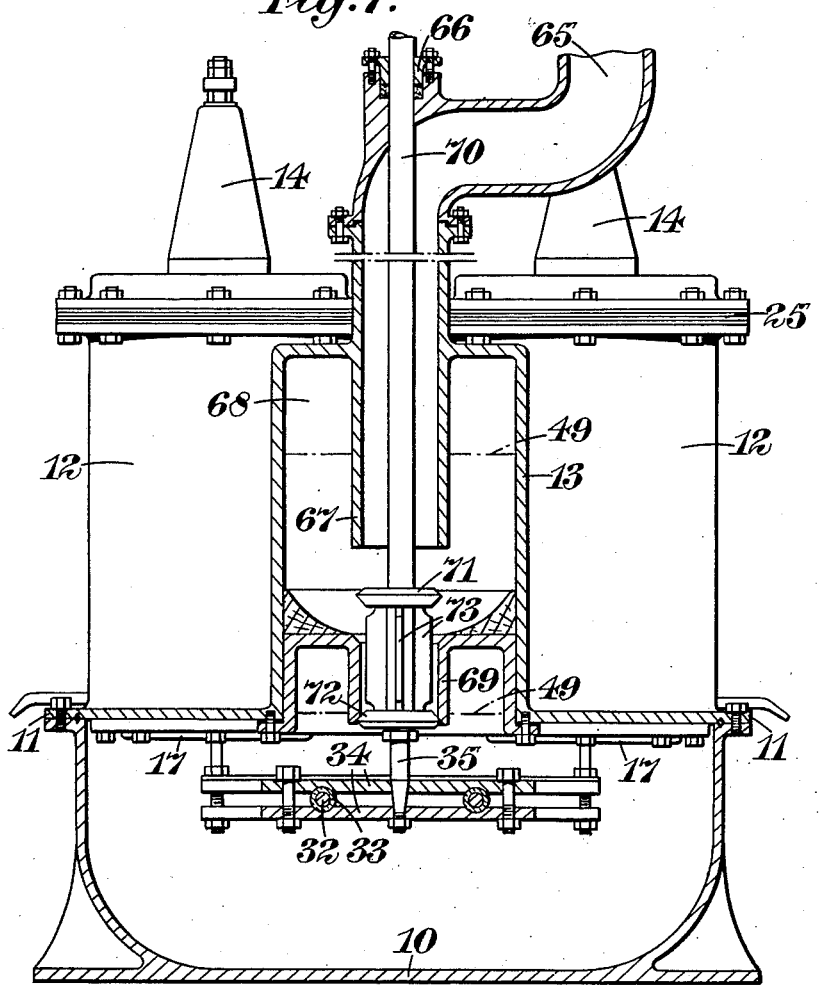

Aug. 22, 1933. W. B. WHITNEY ET AL 1,923,695
ELECTRIC CIRCUIT BREAKER
Filed Dec. 3, 1929     6 Sheets-Sheet 6
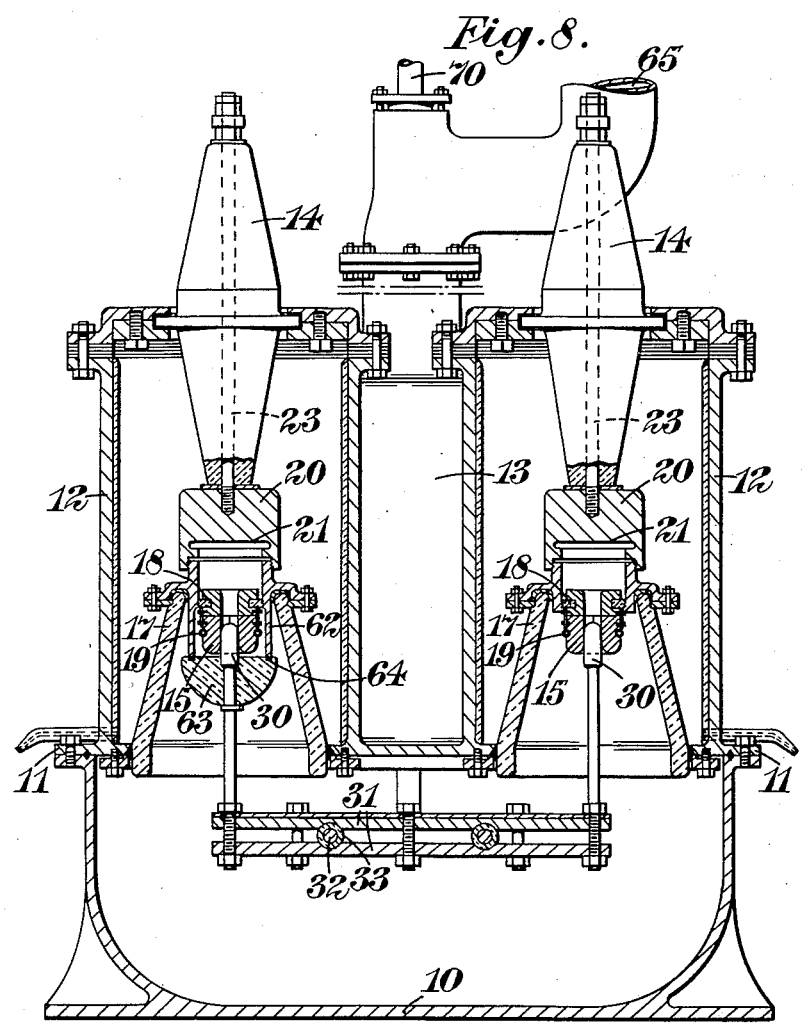

Patented Aug. 22, 1933

1,923,695

UNITED STATES PATENT OFFICE 1,923,695

ELECTRIC CIRCUIT BREAKER

Willis Bevan Whitney and Edmund Basil Wedmore, London, England, assignors to The British Electrical and Allied Industries Research Association, London, England, a British Association Application December 3, 1929, Serial No. 411,307, and in Great Britain December 10, 1928

16 Claims. (Cl. 200—150)

This invention concerns improvements in or relating to electric circuit-breakers and it is particularly applicable to, although not limited to, circuit-breakers adapted for use in high tension A. C. power circuits say of 10,000 k. v. a. and upwards.

The general object of the present invention is to improve devices of the above character in such manner as to make the time required for arc extinction substantially independent of the magnitude of any current to be ruptured at or below the maximum current and voltage for which the breaker is designed, also to make such time of rupture as short as possible and to reduce towards a minimum the total applied energy required to produce the flow of liquid requisite per operation to bring about said results, which energy in this type of apparatus it is often convenient to store in compressed springs or air or gas cushions ready for sudden use.

Various constructions of circuit-breakers have hitherto been proposed in which a flow of insulating liquid has been employed to extinguish the arc but these have suffered from numerous disadvantages. The aim of the present invention is to effectively remove the products of arcing by a stream of insulating liquid and to provide a stream sufficiently rapid and suitably directed for this purpose.

Moreover various constructions of circuit-breaker have been proposed in which a flow of gas is used to extinguish the arc, for example in our British Patent No. 278,764, but the considerations involved differ in many respects and the present invention relates only to circuit-breakers employing a stream of insulating liquid.

In order to attain the above result in the most efficient manner, the arc should be drawn, within a half cycle, at most, to the least gap between electrodes across which the arc can always be safely prevented from restriking by the inflow of insulating liquid between said electrodes, said permanent extinction occurring at the first passage of the current through zero after said gap has been formed. It is found that for given current and voltage the longer said gap and/or the greater the time taken to form it and the greater the arc length, other conditions being constant, the greater is the back pressure created by the arc gases and the more difficult it is to force oil or other fluid into said gap. It is evident that since, for example, oil as commercially supplied can withstand voltages of the order of 40,000 R. M. S. volts across a 4 millimetre gap, only a very small gap would be necessary to prevent reignition of an arc if said gap could be completely filled by said oil in the uncarbonized condition, so that the ideal to aim at is to force the liquid as quickly into the gap as possible and this is assisted the more thoroughly and rapidly the products of arcing (such as gas and carbonized oil) can be vented from the site of the arc and more especially the quicker the arc gas can be driven to a region where it cannot expand into the least gap between the electrodes.

The greatest benefit of our invention is thus obtained by separating the electrodes at high speed a very short distance which, for example, when oil is the liquid employed, (and may have its dielectric strength lowered by carbonization), is of the order of 1 millimetre per thousand R. M. S. volts, by the provision of a vent path through which the arc products are driven by the rapid inflow of liquid under pressure from the commencement of arcing, the said vent path being kept as short as possible and its point of discharge so arranged that at no time during arcing can a long column of liquid be formed in the path of the escape gas. Further, the arc may be prevented from lengthening in the passage (which would otherwise increase gas formation and back pressure at maximum current) by so dimensioning the passageway that the maximum arc for which the apparatus is designed cannot fit into the passageway by looping or bending back upon itself. In addition in order to prevent formation of pockets of relatively stationary gas which might expand into the least gap between the electrodes near an instant of zero current, the surfaces of the electrodes and contiguous guiding surfaces are so shaped that high velocity flow of liquid can take place washing substantially the whole of said surfaces in the neighbourhood of the arc without formation of eddies, and it is clear that the effectiveness of the washing, more especially of the arcing surfaces and surfaces contiguous therewith, is increased by use of gaps which are much smaller than have heretofore been employed for like voltages and powers employing liquid flow for extinction of the arc.

While the greatest benefit is obtained by combination of the above features, benefit as compared with that attained with circuit breakers employing liquid flow and in accordance with the prior art is attained by the use of modifications and combinations described in more detail hereunder.

According to the present invention an electric circuit breaker comprises in combination a reservoir for insulating liquid, a pair of electrodes which are bridged by an arc on breaking circuit, a passageway leading from the point of commencement of arcing (for rapidly venting the products of arcing) and means other than the direct action of gravity and operative independently of said arc for forcing liquid from the reservoir to the neighbourhood of the arc and through said passageway, characterized in that the liquid flow is so controlled or guided (e. g. by rounding or otherwise forming the surfaces of both electrodes and/or adjacent parts) that the liquid washes the major portion of the arcing surfaces of both electrodes, and the electrodes are so moved as to continue to be washed (until the separating movement requisite for arc extinction substantially ceases) by liquid of which the velocity is not substantially reduced and which carries away with it through said venting passageway the whole of the arc products.

The phrase "the major portion of the arcing surfaces" used above, and in the appended claims is intended to mean substantially the whole arcing surface, namely the whole of that area on each of the counter-electrode surfaces whereon the lines of approximately least gap between said counter-electrode surfaces terminate throughout all stages of contact separation until substantially zero velocity of said separation is first attained. The term "approximately" being taken to mean not greater than the least gap at the instant of measurement plus, say, ten per cent of said least gap length. For example, in the constructions shown the whole of the last mentioned area is washed leaving a small relatively stationary portion of liquid close to the center of the tip of the male electrode which for the arc gaps used is not part of the area defined above.

In the constructions described herein the movement of the electrodes so as to continue to be washed throughout arcing by a high velocity stream of liquid is effected by withdrawing the electrodes only a short distance. Thus throughout the whole period of arcing the male electrode remains within the main stream of liquid flowing into the passageway.

In addition to washing the major portion of the normal arcing surfaces, a portion of the liquid stream moving at a velocity comparable with that in contact with the normal arcing surfaces may also wash contiguous guiding surfaces so shaped as to prevent the formation of eddies adjacent said surfaces and in the neighbourhood of the arc, into which, part of the arc might escape from the liquid stream without traversing any portion of the passageway.

According to a modification of the invention a circuit-breaker comprises in combination a reservoir for insulating liquid, a pair of electrodes which are bridged by an arc on breaking circuit, a passageway of which one electrode forms at least a part and means other than the direct action of gravity, and operative independently of said arc for forcing liquid from the reservoir to the neighbourhood of the arc and through said passageway, characterized in that said passageway, from the commencement of arcing, affords a short venting path from said arc to a place of freedom (in the sense as regards length of path and freedom specified herein).

The passage must form an effective vent for the removal of hot arc gases and for this purpose should be free from constrictions and at no time during arcing should contain a very long column of liquid, as it is important to keep at a minimum value the inertia of the column of liquid to be accelerated. The phrase "a short venting path" used above and in the appended claims may, therefore, be taken to means that the minimum cross-sectional area of the passages (or total area of passages where there are two or more in parallel) through which the liquid has to pass after leaving the position of arcing shall not be less than 1/500th of the square of the length of the path from the position of the commencement of arcing to the "place of freedom" described below. In the construction shown in the accompanying drawings the passages are considerably shorter in relation to their cross-section than this, the above ratio being about 1/60th in these cases. The phrase "a place of freedom" is intended to mean a place at which the gas can escape substantially freely from a liquid surface into an initially gas filled space in which during arcing the pressure is not raised sufficiently to substantially impede the discharge of liquid into it. In particular "the place of freedom" may be that at which the vent discharges into a vessel which is adapted to accommodate the liquid discharge in such a way that it will not obstruct the discharge of further liquid through the vent during arcing, and which is provided with means such as cooling baffles to permit the escape of gas from the vessel while controlling or directing it to render it harmless.

According to a further modification of the invention a circuit breaker comprises in combination a reservoir for insulating liquid, a pair of electrodes which are bridged by an arc on breaking circuit and of which one forms part of or constitutes a passageway, and means other than the direct action of gravity, operative wholly or mainly independently of said arc for forcing liquid from the reservoir to the neighbourhood of the arc and through said passageway, characterized in that said passageway is directed upwardly directly from the point of commencement of arcing to serve as a vent for the products of arcing.

Other features of the invention herein described but not claimed, are claimed in our co-pending application Serial No. 180,204, filed April 1, 1927.

The circuit breaker may be constructed so that at least a part of a wall of the passageway is formed by one electrode (or a part electrically connected therewith) but at no cross-section thereof both electrodes (or parts electrically connected therewith) form part of a single boundary wall.

Such limitation will include male and female electrodes in which the wall of the passageway is formed entirely by the female electrode. On the other hand it will exclude a passageway formed by an insulating tube having electrodes inserted through its walls opposite each other. In such a case, at the cross section of the passageway taken through the electrodes both electrodes form part of a single boundary wall and copper deposited from the electrodes during arcing on the remainder of said boundary wall will form a conducting bridge between the electrodes, while undue enlargement of the passage to prevent this is undesirable in view of the fact that it is in this neighbourhood that the maximum velocity of liquid is required where a substantially larger diameter would entail a large mass of oil and consequently wasteful use of power. An annular passageway of which one electrode forms part of the inner boundary wall and the other of the outer boundary wall will be included since no such conducting bridge can form.

Moreover although the invention specifies the provision of means other than the direct action of gravity for producing a flow of liquid the breaker may make use of gravity as well. Thus one of the objects of the invention when applied to A. C. is to ensure that the oil, which is forced away from the arc gap by the expansion of the arc in the latter at each current peak, will return and follow up the arc as the latter decreases with the fall in current and will re-attain its preferred velocity within less than ¼ cycle i. e. before the current has reached zero in its alternation. For this purpose considerable acceleration is necessary and the direct action of gravity alone is quite inadequate. A simple calculation reveals that the oil falling freely under the action of gravity would only move about 1/80th of a centimetre from rest in a quarter of a cycle of a 50 cycle A. C. supply.

Known types of liquid break circuit-breakers in which pressure of the arc gases from an arc to be broken are depended upon to force liquid into the gaseous bubble or arc tunnel about said arc, besides being fortuitously affected by point on the current wave at which arcing commences, suffer amongst other things from the defect that the seat of pressure generation is the arc stream itself which keeps contact, at least at one point, with the main body of gas generated, so that the contents of the gaseous bubble or tunnel between the contacts tend to be at or above the pressure of the main body of gas generated which prevents effective inforcing of liquid to the arc tunnel by the pressure of said gas during arcing.

The present invention secures effective control of the movement of the oil for separation of electrodes at any point on the current wave and at all current values up to the maximum for which a given breaker is designed by providing a passage giving an easy and rapid escape for the arc gases, from the container in which the arc is to be broken by separation of contacts, while at the same time providing a following up force in excess of gravity and operative substantially independent of the pressure of gases from the arc to be broken, (as for example, by means of a separate gas pressure applied to a free surface of the liquid in the container) to drive liquid from the container inwards between the separating electrodes and out through the escape passage.

The construction of the parts may be such that the venting passage is substantially coaxial with the direction of relative movement of the electrodes and the flow of oil approaches said passage substantially symmetrically about said axis passing over the arcing surfaces of both electrodes.

Preferably the flow of oil, at least when the arc is to be extinguished, acquires from rest a maximum velocity of at least 100 cms. per second in the passageway where the cross section is smallest within 1/50th of a second from the commencement of arcing.

Moreover, in order to reduce the quantity of gas produced by the liberated energy at maximum current, the passage may be so dimensioned in cross-section that at the maximum current for which the breaker is designed the arc cannot flow up the passageway without short circuiting itself, as described in connection with a gas blast switch in our prior specification Serial No. 180,204.

It is also preferable that the passage through and beyond the electrodes should be of stream line form and as free from sudden changes of cross section as possible.

Moreover according to the invention more than one break gap in series may be provided in connection with a single reservoir, each break gap being provided with its own passageway for the venting of products of arcing and each phase of a multiphase switch may be provided with one or more reservoirs, each with one or more break gaps and vent passages, or one common reservoir may be provided for all the break gaps of all the phases.

In order that the invention may be more readily understood some examples thereof will now be described with reference to the accompanying drawings, in which—

Figure 1 is a diagrammatic plan showing the arrangement of a three-phase double break circuit-breaker.

Figures 2, 3 and 4 are sectional elevations on the lines 2—2, 3—3 and 4—4 respectively of Figure 1, Figure 5 is a sectional elevation of a modified form of circuit-breaker.

Figure 9:
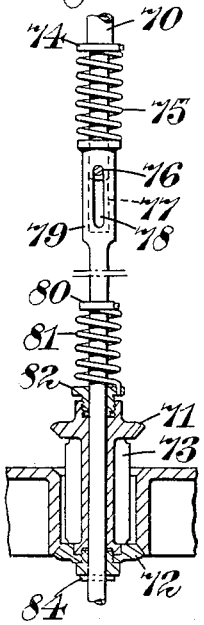
Figure 10:
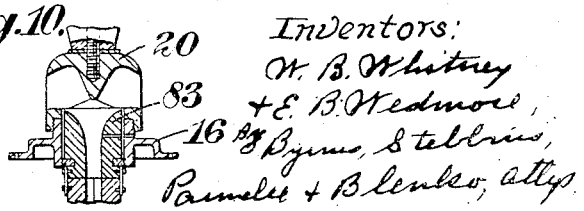

Figures 6, 7 and 8 are views similar respectively to Figures 1, 4 and 3 of another modified form of the apparatus, Figure 9 is a detail view of a modified form of operating rod and valve, and Figure 10 is a detail view of a modified form of female electrode.

Like reference numerals indicate like parts in the various figures of the drawings.

In Figure 1 the three circles along the top represent one break of each phase of a three-phase circuit-breaker. The circle below each of these represents the other break of the same phase. The two circles in the middle represent gas compressing cylinders. Referring to Figures 1–4, the circuit-breaker consists of a rectangular oil reservoir 10 having a top 11 from which there project upwardly six cylindrical casings 12 for supporting switch contacts and two compressor cylinders 13.

Each casing 12 is provided with a flat top in which is clamped an insulator 14 at the lower end of which the switch contacts are situated. The female electrode 15 is supported in a mounting 16 carried on a conical insulated support 17 which is attached at its lower end to the top casing 11 of the reservoir. The female electrode consists of a cylindrical body built up of separate longitudinally extending sections which are held in position by means of a threaded ring 18 engaging a screw-threaded portion of the mounting 16. For the purpose of assembly the ring 18 is formed in two portions. The sections of the female electrode are urged together by means of a spring 19 which encircles them. The mounting 16 has a cylindrical interior and is connected by a screw thread at its upper end to a deflector 20 which is situated at the lower end of the insulator 14 and connected to a conductor 23 extending up through the middle of that insulator. It will be noted that the arrangement of the female electrode between the insulators 17 and 14 is such that friction between the male and female electrodes in opening or closing does not in either case place an insulator in tension nor does the static pressure on the interior of the insulator 17 do so. At its lower end the deflector 20 has a circular hole corresponding to the cylindrical interior of the mounting 16 which hole divides into two and opens outwards. The surfaces 21 of these two portions of the hole are shaped so as to deflect oil squirted upwards through the female electrode down into the bottom of the cylindrical casing 12 to prevent the oil from falling back and impeding the escaping oil. Each of the sections 15 of the female electrode is connected by means of a conductor 22 to the deflector 20 and since the latter is of conducting material the female electrode is in electrical connection with the conductor 23. The mounting 16 is provided with apertures 24 for the passage of oil to be described hereinafter.

The male electrodes 30 are carried on a vertically movable framework situated in the oil reservoir and lying in a substantially horizontal plane. The framework consists of two rods 32 surrounded with a layer 33 of insulating material extending lengthwise of the casing, two pairs of transverse clamping bars 34 and three pairs of transverse clamping bars 31. The bars 34 are situated directly underneath the compression cylinders 13 and are each attached to a vertical rod 35 depending therefrom in a manner to be described hereinafter by means of which the framework is supported. The bars 31 support the male electrodes each pair carrying the two male electrodes of one phase one at each end, and electrically connecting them.

Each of the compression cylinders 13 is provided with a piston 40 to the lower side of which the rods 35 are attached by means of a tapered pin 41. On the upper side of the piston is an upstanding ring 42 the inside of which is threaded to receive a threaded plug 43 through which extends an operating rod 44. The rod 44 extends upwards through a diminished extension 45 of the cylindrical casing which is provided at its upper end with a screw-threaded plug and guide 46. The two operating rods 44 are connected by means of a linkage designated by the numeral 47 by which they can be moved up or down. A helical spring 48 is interposed between the plug 46 and the plug 43 tending to press the piston downwards. The normal level of the oil in the compression cylinder is indicated at 49 and the edge of the piston has a depending skirt 50 the lower margin of which reaches the surface of the oil very shortly after the piston has begun to move downwards from its uppermost position. Thereafter a bubble of air is enclosed in the air-tight space beneath the top of the piston 40. 51 is a gauge for determining the level of the oil.

The operation of the switch is as follows:—

When the circuit is to be broken the operating framework 47 is lowered and the springs 48 force the pistons 40 downwards, thus beginning to withdraw the male electrodes 30 from the female electrodes and at the same time compressing the air under the pistons 40. A small quantity of oil may pass between the sections of the female electrodes but the pressure of the liquid will rise until contact between the male and female electrodes is broken and an arc is started. As the electrodes part a stream of oil will be forced through the gap between them and up through the female electrode and will impinge on the surfaces 21 of the deflector. The compressed air under the piston will maintain the flow of oil for a time after movement of the electrodes has ceased. It is desirable that the dimensions of the parts should be such that after cessation of contact separation the flow of oil continues for a time corresponding to approximately one cycle of the supply with which the breaker is to be used. Between the casing 12 and its cover are plates 25 which are arranged with fine spacings to cool and permit the escape of gas from the casing 12. Thus any gases produced by arcing will be swept by the stream of oil inwards into the female electrode and upwards through it and will ultimately escape from the casing 12. In this construction the oil displaced in the opening process by the piston 50 and collected above the normal oil level 49 in the cylinder 12, will, when the breaker closes again, now flow inwards over the sill 122 of the deflector 20 and through the passages 24 and through the female electrode 15. When the latter is closed by the male electrode, the oil will slowly flow through the passages between the sections of the female electrode which are then slightly open until the normal oil level 49 is regained.

Figure 5 shows an alternative construction and may be regarded either as a view similar to Figure 3 of part of a three-phase circuit-breaker or as a sectional elevation of a single phase breaker. In this case one of the breaks of a phase occurs before the other and the arc produced at the contact which breaks second is extinguished by a stream of oil produced by the gas pressure generated by the arc at the contact which breaks first. It will be noted that the flow of oil past the arc to be extinguished is not produced by that arc itself but by an arc in series with it. Thus the female electrode 15 is similar to that described in connection with Figures 1–4 whereas the female electrode 55 has no provision for a stream of oil to extinguish the arc. The cylindrical casing 12 in which the electrode 55 is housed has a horizontal partition 56 slightly below the level of the surface of the oil in which partition is mounted an insulator 57 which carries the electrode 55 at its lower end, thus the electrode 55 is considerably more deeply immersed in the oil than the electrode 15. The horizontal partition 56 has a few small seepage passages to allow slow escape of gas. Between the two casings 12 is a cylindrical casing 58 which affords a bearing for an operating rod 59 and in addition affords an annular air cushion in a space between outer and inner cylindrical walls. The male electrode 60 corresponding to the female electrode 55 is similar to the electrode 30 but shorter, its length being such that at the speed of movement used the electrodes 55 and 60 will part say one half cycle before the electrodes 15 and 30. Thus as the breaker is opened an arc is formed between the electrodes 55 and 60 generating heat and a certain amount of gas. This, since the escape of gas through the seep holes 56 is delayed by the intervening oil, compresses the air in the casing 58 and places the oil in the reservoir under pressure and directly the contacts 15 and 30 part a stream of oil is forced through the gap between them and extinguishes the arc. The gas formed in the right hand half of the apparatus gradually passes away through the holes 56 which are partially blocked by oil.

In the modified construction shown in Figures 6, 7 and 8 the oil is put under pressure by gravity. The flow produced by gravity would however be quite inadequate since however great the head the acceleration could never exceed that of the oil falling freely under the action of gravity, and under these circumstances the distance moved in one quarter of a cycle of a 50 cycle supply is only about one eighth of a millimetre and the velocity obtained is only 5 cms. per sec. For this reason means other than gravity is provided for producing the flow and such means comprises an annular air cushion in the space 68, in the top of the cylindrical casing 13. The oil supply pipe 65, in which a constant head of oil can be maintained, for example by a tank with a ball cock, bends as shown at such a height as to leave an adequate clearance between said pipe and the terminal at the top of the insulator 14, and opens downwardly into the cylinder 13. Within this cylinder the supply pipe has a downwardly projecting extension 67 which forms the inner wall of the annular air cushion 68. An operating rod 70 extends centrally through the pipe 67 and out through a gland 66 at the bend of the pipe 65.

At its lower end 35 the rod 70 carries cross bars 34 similar to those already described. Above these is a valve for determining the starting and stopping of the flow of oil. For this purpose the cylinder 13 is closed at its lower end and the closure carries a short central tube 69 at each end of which is a valve seating. Valve discs 71 and 72 connected by guides 73 engage the respective seatings when the rod 70 is in its lowermost and uppermost position respectively. It will be noted that in this construction a permanent cushion of gas for example, air is trapped between the inside of the cylinder 13 and the outside of the pipe 67, being compressed by the head of oil in the pipe 65 to a level, for example 49 shown in Figure 7. When the rod 70 is in any intermediate position the valve is open and a flow of oil from the cylinder 13 to the reservoir 10 is permitted. It will be seen from the position of the tube 69 that a further annular air cushion is provided between the outside of that tube and the inside of the lower end of the cylinder 13. This air cushion maintains the flow of oil past the contacts for at least a cycle after the valve 71 has been closed and after the full separation of the contacts 30 and 15 has been reached. The oil owing to the head in the pipe 65 at all times fills the rest of the container 10 to the top of the free space within the insulators 17 while the oil which passes through the female electrode into the space outside said insulators is drained or pumped away as desired through the outlets 111.

In Figure 8 is shown a further valve mounted on the male electrode 30. The mounting 16 is formed with a tubular downward extension 62 the lower margin of which affords a seating for a packing ring 64 carried by a valve 63 preferably of wood or other insulating material, mounted on the male electrode. Thus when the contacts are fully closed leakage of oil past the electrodes (for example between the sections of the female electrode if slightly open) is definitely prevented, irrespective of the pressure of the lower annular air cushion and any leakage past the valve 72. In the construction shown at the right hand break of Figure 8, the valve 63 is not employed.

Figure 9 shows a modified arrangement of the operating rod 70 to provide a pause in the movement of the electrodes followed by further movement thereof after the valve 71 has closed. The lower end of the rod 70 fits into a bore 77 in an extension rod 79. Limited relative movement longitudinally is permitted by a pin 76 engaging a slot 78. The extension rod 79 is normally urged downwards with respect to the rod 70 by means of a spring 75 engaging a collar 74 fixed to the rod 70, the spring 75 being under slight initial compression sufficient to overcome (without substantial further compression) the inertia of the parts below when movement of 70 starts. The valve 71, 72 is a sliding fit on the rod 79 and is provided with a gland 82. A spring 81, which may be stronger than 75, is interposed between the gland 82 and a collar 80 fixed on the rod 79. The spring 81 is given an initial compression greater than that of the spring 75 and downward movement of the valve 71, 72 on the rod 70 is prevented by a pin 84.

The action of the device is as follows: With the parts in the positions shown in Figure 9 the whole operating mechanism begins to descend opening the valve 72 and parting the electrodes. When the preferred gap is reached the valve 71 closes on its seating and any further motion of the rod 79 is opposed by the spring 81. The rod 79 is therefore checked while the rod 70 continues to descend compressing the spring 75. When the force exerted by that spring exceeds that exerted by the spring 81 or when the pin 76 reaches the bottom of the slot 78 motion of the rod 79 with motion of the electrodes continues. It will be seen that this device only supplies oil during the short portion of the stroke during which arcing occurs. On closing the switch from the full open position, a stream of oil is again obtained the valve 71 opening and the air in the upper annular cushion supplying the energy to compress the air in the lower cushion and produce the flow of liquid until the contacts come into engagement.

At the end of movement the pressure in the cylinder 13 is restored as before by the static head.

By limiting the movement of the electrode during arcing in this manner not only is the extension of the arc minimized but in addition the arcing surface of the male electrode continues to be washed by liquid of which the velocity is substantially unreduced.

The oil which passes through the contacts strikes the deflector 21 by which it is directed outwardly and downwardly into the space outside the insulator 17. In the construction shown in Figure 6, 7 and 8, however, unlike those shown in Figures 1–5, the oil does not flow back to the reservoir through the electrode 15 but is drained away through a pipe 111 whence if desired it can be pumped back for further use either with or without filtering.

In all the constructions illustrated it will be appreciated that since the cross-sectional area of the base of the supports 17 and the reservoir 10 is large compared with that of the space between the male and female electrodes as they separate the velocity of the oil in the latter space will be very much greater than in the other parts. Thus the majority of the oil is not substantially accelerated and frictional effects are mainly confined to the comparatively small mass of oil which actually passes through the female electrode. Thus when the contacts part the oil is quickly started in motion through the said passage.

In all the constructions illustrated the deflector surface 20, instead of being shaped to turn the oil through a greater angle than 90° as shown in the drawings, may be shaped to deflect it less than 90° but preferably clear of the surface of the insulator 14. In designing the upper collar of 16, the height of the sill 122 above the seep-hole 24 should be such that, when this height is multiplied by the area of the annular space between its outer surface and the inner surface of the cylinder 12, the volume is greater than the volume of liquid squirted through the female electrode during arcing. This is in order that back-flow of oil over the sill 122 may not take place during arcing, the back-flow through the seep-hole 24 being negligible in this time. The above volume is equal to $a \times v \times t$, where $a$=cross-section of the passage in the female electrode in sq. cm., $v$=average velocity of liquid through said passage, in cm. per sec. taken for example at 2500 cm. per sec. and $t$= time from commencement of flow to arc extinction in sec. For a breaker with 5/8" diameter passage, and rupturing, say, 2000 amps. at 5500 volts per break (R. M. S. values) and taking $t$=4/100 sec., the above volume will be of the order of only 200 cc. per break. In Figure 8 the space between the insulator 17 and the wall of 12 is usually amply sufficient, as the oil level there is always low before arcing, having been drained away through the pipe of small diameter shown above 11.

With a modified form of experimental breaker constructed to obtain data and employing only a single break and using compressed air from a supply instead of from the piston 40, experiment has shown that power arcs e. g. of over 1000 amperes can invariably be extinguished in one cycle or arcing at a potential of some 5,500 R. M. S. volts, with a considerable reduction in energy released in the arc as compared with an ordinary circuit-breaker operating under the same circuit conditions.

The construction of the experimental breaker is briefly as follows. The female electrode is mounted centrally in the top of a cylindrical casing through the bottom of which the male electrode projects upwardly. The male electrode carries a valve in general similar to the valve 63 of Figure 8. An inner cylinder surrounding the female electrode depends concentrically from the top of the casing but terminates short of the bottom thereof, and is completely full of oil. An annular chamber is thus formed between the inner and outer cylinders with the top of which a gas pressure pipe communicates. Gas from the above mentioned gas pressure pipe is entrapped in the top of the annular chamber and acts similarly to the gas cushion 68 of Figure 7. On the top of the casing surrounding the outlet from the female electrode is a short vent pipe which is surmounted by a deflecting hood.

In one experiment with such experimental apparatus, the total distance from the level of the surface of the oil in the annular chamber (i. e. the surface at which pressure is applied by the gaseous medium) measured in the oil down to the bottom of the inner cylinder and from thence up to the female electrode and through it and through the vent pipe to the outlet at the upper end of this pipe was approximately 75 centimeters. In this test the oil in the passage in the female electrode and vent pipe, and accounting for 15 centimetres of the 75 centimetres above mentioned, was subject to considerable acceleration by the applied pressure and it was found that at the end of a half cycle of arcing the velocity of the oil and other conditions were such that the arc was then extinguished.

In this test, the applied voltage across the single break was 5,500 R. M. S. volts, the current was 1500 R. M. S. amperes totally symmetrical, the velocity of separation of the electrodes approximately 150 centimetres per second, the frequency of the system was 40 cycles per second the power factor less than 0.1, the pressure in the annular chamber approximately 5 pounds per square inch above atmospheric pressure, and the valve which was on the stem below the male electrode separated from the mouth of the female electrode about 3 hundredths of a second before arcing commenced though very little oil flowed before the male electrode left the passage. The diameter of the male electrode and that of the passage in the female electrode were each about 5/8ths of an inch and the diameter of the oil filled vessel immediately surrounding the electrode was 8" giving an area approximately 200 times larger than the throat of the passage in the venting electrode, and the flared entrance to the female electrode had a radius of $\frac{5}{16}$ inch and the length of the passage in the electrode was 2¼ inches. The internal diameter of the short vent pipe was 1½ inches and its length 3 5/8 inches, and the arc length was about 0.5 centimetres though slightly greater lengths would have also been satisfactory.

The pressure of 5 lbs. per sq. inch (above atmospheric) in the example given is given as an approximate figure and fuller experiment may show that a slightly lower or higher pressure is sufficient for safe operation in the apparatus used. For given contacts, passage length and diameter, the applied pressure necessary to produce the required oil blast will have to be increased roughly in proportion both to the peak current and applied peak voltage to be dealt with by the breakers.

Longer gaps will also be required with high applied voltages. Other means than that described for producing the required pressure may be used.

The passage formed in the female electrode, its holder the vent pipe therefrom and the vent opening—should, for the best results, be so dimensioned and/or arranged as to ensure that the arc gases can escape freely as fast as they are formed so that they do not tend to accumulate within the arcing chamber thus driving the oil backwards from the entrance to the female electrode and so that there is no material increase in any back pressure tending to oppose the escape of the hot gases and oil during arcing.

The distance from the point of separation of the contacts to the surface of oil in the vent passage is kept as small as possible in relation to the distance from said point of separation through oil to the surface at which gaseous pressure is applied to the aforesaid annular chamber. Thus, when arcing commences or sudden pressure alterations occur at any time during the operation of breaking the circuit, the flow of oil tends to take place in the direction in which there is least inertia to be overcome; that is to say, the flow of oil will take place upwardly through and out from the vent.

While maintaining the above relationship it is important (where oil has to pass from the position of primary application of pressure through relatively small passages before reaching the arc) to keep the distance from the point of application of pressure on the oil surface to the point of contact separation (that is the point of commencement of arcing) as short as possible, in order to reduce the mass and hence the inertia of the oil to be moved towards the arc. It will be noted in Figure 7 where the oil has to pass through a passageway at 72 that while the length of vent passage 18 is small compared with the distance from the point of contact separation to the nearest surface of application, yet the latter distance is also kept small by the introduction of an arrangement for pressure application closer to the point of contact separation than the primary source of application. The intermediate and primary sources of pressure application are shown as the cushion surrounding 69, and the cushion 68 in Figure 7 respectively.

In order that the maximum velocity of flow may be attained across the adjacent contact surfaces as they separate and apart from the consideration of the gap required to withstand the available voltage it is preferable that the separation of the contacts to break circuit should be such that, the area of influx between the two contacts is not greater than the cross-sectional area of the passage in the female electrode. For example when the radius of curvature of the top of the male electrode and of the bottom edge of the female electrode are equal to $$\frac{D}{2},$$

D being the diameter of the male electrode and approximately that of the passage in the female electrode, then the preferred position so far as velocity of liquid flow is concerned is reached when the male electrode has moved downwards a distance=¾ D from the position when arcing commenced, i. e. from the point of contact separation which is taken as the line of intersection of the outwardly splayed mouth of the female electrode and the parallel walls of the tubular passage in the same. In the above preferred position for flow the least gap between the electrodes, which in the example given above is $$\frac{D}{4},$$

must be kept greater than the thickness of oil that can be punctured by the peak voltage across the gap, thus for convenience of reference we refer to the "desired gap" as obtained at a given voltage when the "preferred gap for flow" coincides with the "least gap" say for the applied voltage. If the value obtained for this desired gap is not sufficient for safety (as for example due to the possibility of partial bridges, e. g., copper beads), a bigger gap than the desired gap to be referred to as the "preferred safe gap" can be used. Experiment shows that for given contacts and speed of separation, the longer the gap, the higher the operating pressure which has to be used to drive the oil through the passage due to the greater liberation of arc energy and arc gas accompanying the longer break.

Preferably the preferred safe gap is not greater than about seven times the minimum gap at which with the electrodes immersed in the uncarbonized stationary liquid employed, the maximum peak voltage which the insulation of the breaker to earth will withstand may be applied without spark when the electrodes have already been separated.

In practice it has been found that aforesaid least gap between the electrodes during the above mentioned pause should be of the order of 0.5 cms per 6000 volts R. M. S.

In some tests, however, 0.3 cms. or even .25 cms. has been found sufficient and the latter may serve as a basis for the design of the electrodes. Thus the radius of curvature of the opposing edges of the male and female electrodes as seen in axial section may be not less than $$\frac{e}{17,000}$$

cms. where $e$ is the maximum peak voltage to be ruptured. This figure is arrived at as follows:—As stated above the gap at which the cross section of flow is the same as that of the passageway is $$\frac{D}{4}.$$

This is to be equal to 0.25 cms. per 6,000 volts R. M. S. i. e., per 6,000 $\sqrt{2}$ peak volts. Thus the radius $$\frac{D}{2} \text{ is equal to } \frac{2 \times 0.25 \times e}{6,000 \sqrt{2}} = \frac{e}{17,000} \text{ cms.}$$

The position of the male electrode when the desired gap has been reached is approximately shown in Figures 2, 3, and 4 which give a good idea of the shortness of gap necessary to rupture circuits under the particular conditions employed.

After the above separation of contacts to break circuit during which, if the pressure applied to the oil is adequate, the arc is invariably ruptured, the male electrode should be moved downwards to create a final "safe gap" for insulating purposes in the full open position. A method of providing the pause and a continuation of movement thereafter has been described in connection with Figure 9.

The duration of this pause, when not governed by a series-coil-operated device (which latter is so arranged as to stop or delay continuation of movement until after the current has ceased) should preferably be at least equal to one period of the frequency of the system on which the circuit-breaker is operating.

With regard to the dimension of the "least gap", if the limiting dimension below which the arc at the applied voltage can reform after passing through zero is found to be very small, say under half a centimetre as in the present construction when used at 5,500 volts, it is advisable to arrange for a slightly greater gap. i.e., a "preferred safe gap" to provide for emergencies and to allow for a factor of safety. To produce this degree of separation e. g. approximately .5 cms. plus a factor of safety in the present instance the male electrode has to travel some one and a half centimetres on account of its curved surface and of the curved surface of the female electrode plus sufficient further movement to provide such factor of safety.

It should be the aim of a designer of a circuit-breaker according to the present invention to provide for the introduction of the aforesaid preferred safe gap as quickly as possible in the breaking of the circuit. To this end the speed of separation of the electrodes, should be the maximum obtainable with the particular apparatus under design and as a guide to a lower limit it may be mentioned that this speed preferably should be high enough to introduce the safe gap within a time-period equivalent to that occupied by one half cycle of the frequency of the system on which the circuit-breaker is to operate.

If for constructional reasons, the high velocity of electrode-separation thus required for the longer gap associated with high voltages, is not readily obtainable, the said longer gap may be formed in more than one half-cycle.

In breakers when the above mentioned preferred safe gap is reached in the full open position and in order to isolate the system adequately beyond the break and prevent any chance of the arc restarting a series isolating break may be opened in oil (or any other suitable insulating medium such as air) after the arc has been extinguished as above described and preferably before the oil flow has fallen below a predetermined velocity. This can be operated by well-known means, as for instance the release of a latch held closed by a series solenoid until current flow is cut off and then the opening of the isolating break by the thrust of a spring. In a convenient construction, the lower end of the male electrode or an operating rod of the latter enters a receptacle formed in the apparatus below the tank. Within this receptacle, which contains a good dielectric such as oil, there is arranged an isolating switch adapted to be opened and closed by the movements of or derived from the rod in the making and breaking of the circuit at the electrodes.

The rod itself or a contact carried by it may form one of the members of this isolating switch, which is arranged electrically in series with the electrodes in the circuit controlled by them. The series switch above mentioned is so arranged as to be opened after the arc at the electrodes has been quenched and before the oil flow has fallen below a predetermined velocity, and in the closing operation to close before the electrodes engage, and forms one example of means which may be provided for isolating one electrode from the other, to prevent re-starting of the arc, by the interposition of a good dielectric such as oil.

The male electrode (particularly in cases where relatively heavy currents are to be carried by it) may be fluted, pierced or otherwise so formed as to provide, in this electrode also, facility for the flow of the oil when the electrodes are in engagement. For instance, this electrode may be pierced from its apex by a bore extending downwardly axially of the electrode for some distance and then leading out to the side of the electrode by one or more passages through which, when the electrodes are in contact, oil may flow into and then up through the said bore.

Although the particular form of female electrode herein described has been found to give very good results, it is to be understood that the invention is not limited to such a construction: for instance instead of being rounded at its lower end as hereinbefore described, the electrode may have a more extended downwardly-flaring opening to form with the counter electrode during a greater degree of opening then possible with the electrodes shown, an entrance mouth of stream-line shape and preferably it may have a flared upward opening as in Figure 10, which shows a preferred form of female electrode the upper part of which is provided with a stream line extension 83. It is desirable wherever possible to design the parts so that the flow of the oil is along smooth paths so as to prevent eddies and consequent loss of velocity and formation of gas pockets.

To prevent liability of the moving electrode rebounding in the opening operation of the breaker, there may be provided any suitable means—such as a spring-controlled latch—which acting on a part of the operating mechanism will permit it to move in the required direction to open the breaker but will prevent accidental movement in the opposite direction, which might so shorten the gap between the electrodes as to allow spark over, and restarting of the arc.

In the construction herein detailed, the arc is struck from an inner wall of a passage formed in one of the electrodes and is quenched by a flow of oil along such passage. The passage may be so dimensioned in relation to the cross-section of the arc that the arc at maximum current will be unable to loop back along itself within the passage without becoming short-circuited. This short-circuiting of part of the arc is due to the fact that the wall of the passage (or the portion thereof constituted by the electrode) presents substantially an equipotential surface which will short-circuit the portion of the arc extending between the arc-root and another part of the arc that may happen to engage that surface. Preferably, the dimension of the passage in relation to the cross-section of the arc is such that, not only is looping of the arc prevented as aforesaid but any attempt of the arc-root to creep into the passage at maximum current will be frustrated by the arc engaging the passage wall thereby short-circuiting the part of the arc that has succeeded in entering the passage, and returning the arc-root to or near its initial position at the passage mouth. In order to obtain the best results in this respect it would appear that the diameter of this passage should not materially exceed a dimension of the order of twice the diameter of an arc crater or burn formed by an arc between contacts during the whole cycle of arcing. For any given apparatus, this can be preliminarily measured in a different apparatus (which should have, however, electrodes of the same mass as those to be used in the given apparatus) by using a low voltage current of the same value as that to be dealt with in the given apparatus and taking care that conditions of oil, oil pressure and time of arcing are the same in both cases. If, however, a passage based upon such measurement proves to be too small to allow of an adequate velocity of the oil flow, a passage large enough to permit the required velocity can be used, and a metallic grid (which in certain cases may take the form of a partition or a central cylindrical portion extending longitudinally of the passage) inserted in the passage near the arcing location, the perforations in the grid or the gap between the central cylindrical portion and the surrounding wall of the passage, being each not greater than the size obtained from the measurement above mentioned. When such a grid is used, care should be taken to ensure that the length of the passage between the grid and the bottom end of the passage i.e. the locality of contact separation, is kept as short as possible to avoid any tendency for lengthening of the arc which might occur with a large passage as aforesaid and should be designed to minimize hindrance to escape of oil and gas. A grid comprising a central cylindrical portion as aforesaid can be arranged to extend to the point of contact separation if for example the bottom contact is of the female type. This grid or central partition or portion will be in electrical connection with the electrode to which it appertains.

It is to be understood that the constructions just described are designed and intended to be set to minimize extension of the arc under short-circuit conditions, that is to say, to enable the worst case that can arise to be dealt with successfully. Consequently, at loads smaller than loads on short-circuit there may be some lengthening of the arc.

In apparatus to which the present invention relates there are frequently provided secondary or auxiliary contacts which, opening subsequently to the separation of the main contacts, have the arc formed between them in the breaking of the circuit.

In circuit-breakers according to the present invention, the electrodes thereof may constitute the main contacts of the circuit to be broken, or they may constitute the auxiliary or secondary contacts above referred to. In the latter case, the main contacts may be outside or even remote from the breaker containing the auxiliary contacts. Moreover, in breakers according to the present invention, such secondary contacts may be reduced to a minimum as regards their mass and provided their shape is such as to prevent formation of gas pockets and eddy flow they may be butt contacts instead of rubbing or wiping contacts, as in the constructions herein detailed. Where, as just mentioned, a circuit to be broken is provided with both main and secondary contacts, these main and secondary contacts may be constituted by the electrodes of circuit-breakers constructed in accordance with the present invention.

Care should be taken that connecting pipes and valve openings are of sufficient cross-sectional area as to allow of the requisite oil pressure being set up in the tank before the separation or before the closing of the contacts take place. Further, passages and openings through which oil flows should, where possible, conform to stream-line shape.

The apparatus has been described as employing oil as the insulating liquid but any other insulating liquid may be used, including water, preferably distilled, carbon-tetrachloride or other liquid from which the arc gas in contact with air is non-inflammable.

We claim—

1. An alternating current electric circuit breaker comprising in combination a reservoir for insulating liquid having two limbs extending upwardly above a passage connecting them, a pair of electrodes which are disposed in one limb thereof, which are bridged by an arc on breaking circuit, and of which one forms at least a part of a relatively narrow portion of a passageway which leads from the point of commencement of arcing and is directed upwardly directly therefrom, for rapidly venting the products of arcing, and means to impart to the liquid in the other limb a pressure which will force liquid at high velocity upwardly between arcing contacts and through the venting passageway.

2. An alternating current electric circuit breaker comprising in combination a reservoir for insulating liquid having two limbs extending upwardly above a passage connecting them, and having venting means at their upper ends, a pair of electrodes which are disposed in one limb thereof which are bridged by an arc on breaking circuit and of which one forms at least a part of a relatively narrow portion of a passageway which leads from the point of commencement of arcing and is directed upwardly directly therefrom, providing the principal venting path from the lower portion of said limb, and for rapidly venting the products of arcing, and a second pair of electrodes in the other limb electrically in series with said first pair of electrodes and operating means for separating said last mentioned electrodes before arcing commences at the first mentioned electrodes, to force liquid between the latter and through the venting passageway.

3. An alternating-current electric circuit-breaker, comprising in combination a reservoir for insulating liquid, a pair of electrodes which are bridged by an arc on breaking circuit, a passageway for rapidly venting the products of arcing and of which one electrode forms a part, which passageway leads from the point of commencement of arcing to a chamber for receiving the liquid, and means operative independently of said arc for producing a flow of liquid from the reservoir over the arc-bearing surfaces of the electrode and through the passageway, and operating means serving to separate the electrode surfaces to a preferred gap at which the arc cannot restrike, thereafter to retain them for at least a half a cycle, substantially at this gap, and finally to effect further separation.

4. An alternating-current circuit-breaker, comprising in combination a reservoir for insulating fluid, a pair of electrodes which are bridged by an arc on breaking circuit, a short passageway affording free vent before cessation of arcing which leads from the region of arcing, for rapidly venting the products of arcing, and means for producing a flow of fluid from the reservoir over the arc-bearing surfaces of the electrodes and through the passageway, and operating means to separate the electrodes, comprising resilient separating means, and means to oppose separation of the electrodes beyond a preferred distance and thus requiring an increase of force to produce further movement, and introducing a pause in the separating movement of the electrodes.

5. An alternating-current circuit breaker comprising in combination a reservoir for insulating fluid, a pair of electrodes which are bridged by an arc on breaking circuit, a short passageway, affording free vent before cessation of arcing, which leads from the region of arcing, for rapidly venting the products of arcing, and means for producing a flow of fluid from the reservoir over the arc-bearing surfaces of the electrodes and through the passageway, and spring-pressed operating means to separate the electrodes comprising a yielding abutment to oppose separation of the electrodes beyond a preferred distance, an increase of force being required to produce further movement whereby a pause is introduced into the operating movement of the electrodes.

6. An alternating-current electric circuit-breaker comprising in combination a reservoir for insulating liquid, a pair of electrodes which are bridged by an arc on breaking circuit, a passageway of which one electrode forms a part, which passageway leads from the point of commencement of arcing to a chamber for receiving and retaining the liquid discharged through the said passage, and means operative independently of said arc for producing a flow of liquid from the reservoir over the arc-bearing surfaces of the electrode and through the passageway, and operating means serving to separate the electrode to a preferred gap at which the arc cannot restrike, thereafter to retain them for at least a half cycle, substantially at this gap, and finally to effect further separation.

7. A circuit-breaker comprising a pair of electrodes, comprising a hollow electrode, and an inter-engaging solid electrode, between which electrodes an arc may form during operation of the breaker, a container for liquid, an outlet therefrom passing through the said hollow electrode, the opening of which outlet enables a flow of liquid to take place from the container whether or not an arc is formed, which flow can be utilized to rupture the arc, and means for producing such a flow of liquid at high velocity comprising a compressible cushion which is operative upon a surface of the liquid, and means to force liquid under pressure to compress the cushion for use before relative movement between the electrodes to break the circuit, commences, wherein the initial compression of the cushion for use is effected through a column of the liquid, and wherein the shortest distance through the liquid from the aforesaid arc to the liquid surface to which pressure is applied by the cushion, is less than the shortest distance through the liquid from the arc to the farther end of the aforesaid column of liquid.

8. An alternating-current electric circuit-breaker comprising in combination a reservoir for insulating fluid, a pair of electrodes which are bridged by an arc on breaking circuit, a passageway which is formed in one electrode and which leads from the point of commencement of arcing, for rapidly venting the products of arcing, and means for producing a flow of fluid from the reservoir over the arc-bearing surface of the electrodes and through the passageway, and a pair of insulators in compression axially of the electrodes which serve to support the electrode, having the passageway in it, between them, and through one of which insulating fluid is led under pressure through said passageway.

9. An alternating-current electric circuit-breaker comprising in combination, a reservoir for insulating fluid, a pair of electrodes which are bridged by an arc on breaking circuit, a passageway which is formed in one electrode and which leads from the point of commencement of arcing, for rapidly venting the products of arcing, and a spring-pressed piston for producing a flow of fluid from the reservoir over the arc-bearing surfaces of the electrodes and through the passageway, and a pair of insulators in compression axially of the electrodes which serve to support the electrode having the passageway in it, between them, and through one of which insulators fluid is led under pressure through said passageway.

10. An alternating-current electric circuit-breaker comprising in combination, a reservoir for insulating liquid, a pair of electrodes which are bridged by an arc on breaking circuit, a passageway which is formed in one electrode and which leads from the point of commencement of arcing, for rapidly venting the products of arcing, and a spring-pressed piston for producing a flow of liquid from the reservoir over the arc-bearing surfaces of the electrodes and through the passageway, and a pair of insulators in compression axially of the electrodes which serve to support the electrode having the passageway in it, between them, and through one of which insulators liquid is led under pressure through said passageway.

11. An alternating-current electric circuit-breaker comprising in combination a reservoir for insulating liquid, a pair of electrodes which are bridged by an arc on breaking circuit, a passageway which leads from the point of commencement of arcing, for rapidly venting the products of arcing, and means comprising a second arc in series with the arc aforesaid for producing a flow of liquid from the reservoir over the arc-bearing surface of the said electrodes and through the passageway, and operating means serving to separate the electrode to a preferred gap at which the arc cannot re-strike, thereafter to retain them for at least a half a cycle, substantially at this gap, and finally to effect further separation.

12. An alternating-current electric circuit-breaker comprising in combination a reservoir for insulating liquid, a passageway therefrom having a throat and a wider outlet portion, a pair of electrodes which are bridged by an arc which is formed within the aforesaid structure on breaking circuit and in one of which electrodes the aforesaid throat is formed and provides a contacting surface for the counter-electrode, a chamber whereof at least a portion of the space within it is liquid-free and has means for venting the products of arcing therefrom, said passageway being in free communication with said liquid-free space of the chamber from the point of commencement of arcing at least when the circuit is being opened (for rapidly venting the products of arcing), and means comprising a second arc in series with the arc aforesaid for producing a flow of liquid from the reservoir over the arc-bearing surfaces of the said electrodes at high velocity and through said passageway.

13. An alternating-current electric circuit-breaker comprising in combination a reservoir for insulating liquid, a passageway therefrom, a pair of electrodes which are bridged by an arc which is formed within the aforesaid structure on breaking circuit, and through one of which the most constricted portion of the aforesaid passageway passes in the immediate neighborhood of the position where said electrodes make contact, an operating rod for effecting relative movement between the said electrodes, a chamber whereof a portion at least is liquid-free, said passageway providing a short path from the point of commencement of arcing to said materially liquid-free portion of the chamber (for rapidly venting the products of arcing), and a piston operatively connected to said electrode-operating rod for forcing a flow of liquid from the reservoir over the arc-bearing surfaces of one electrode and through the passageway in the other electrode when the circuit is being opened.

14. An alternating-current electric circuit-breaker comprising in combination a reservoir for insulating liquid having two limbs extending upwardly above a passage connecting them, a pair of electrodes which are disposed in one limb thereof, and which are bridged by an arc on breaking circuit, an operating rod for effecting relative movement between said electrodes, one of which electrodes forms at least a part of a relatively narrow portion of a passageway which leads from the point of commencement of arcing and is directed upwardly directly therefrom, for rapidly venting the products of arcing, and a solid (as distinguished from a liquid) piston in the other limb and means to move it to impart a pressure to the liquid which will force liquid at high velocity upwardly between the arcing contacts and through the venting passageway.

15. An electric circuit-breaker comprising a reservoir for liquid, separable electrodes mounted therein, a partition separating the said reservoir into a first and second chamber, an outlet from the second chamber for venting the arc gas therefrom, an aperture in said partition formed at least in part in one of the aforesaid electrodes mounted therein, leaving a free passage for flow of liquid between the first and second chamber at least when the said electrodes are separated, the counter-electrode being mounted in the first chamber, a solid (as distinguished from a liquid) piston in direct communication with the said first chamber, and means for actuating said piston to drive liquid at high velocity through the said aperture into the second chamber when the electric circuit through the electrodes is being opened.

16. An electric circuit-breaker comprising a reservoir for liquid, a partition separating the said reservoir into two chambers one above the other, an aperture in the said partition, a hollow electrode mounted in the said aperture, said electrode having a short passageway through it, a counter electrode mounted in the lower chamber, means for separating the electrodes, a solid (as distinguished from a liquid) piston in communication with the lower chamber, and means for actuating said piston to drive liquid at high velocity through said aperture into the upper chamber.

WILLIS BEVAN WHITNEY.
EDMUND BASIL WEDMORE.